United States Patent
Watanabe (10) Patent No.: US 7,813,206 B2
(45) Date of Patent: Oct. 12, 2010

(54) TIME-SWITCH CARRYING REMOVABLE STORAGE AND SEMICONDUCTOR INTEGRATED CIRCUIT

(75) Inventor: Hiroshi Watanabe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 554 days.

(21) Appl. No.: 11/845,451

(22) Filed: Aug. 27, 2007

(65) Prior Publication Data
US 2008/0133833 A1 Jun. 5, 2008

(30) Foreign Application Priority Data
Nov. 30, 2006 (JP) ............................. 2006-324729

(51) Int. Cl.
*G11C 7/00* (2006.01)
(52) U.S. Cl. ...................... 365/223; 365/205; 365/206; 365/207
(58) Field of Classification Search ................. 365/223, 365/205, 206, 207
See application file for complete search history.

(56) References Cited

U.S. PATENT DOCUMENTS

| | | | |
|---|---|---|---|
| 6,798,697 B2 * | 9/2004 | Hosono et al. ......... | 365/185.12 |
| 7,009,878 B2 * | 3/2006 | Hosono et al. ......... | 365/185.03 |
| 7,075,284 B2 | 7/2006 | Watanabe et al. | |
| 7,208,933 B2 | 4/2007 | Watanabe et al. | |
| 7,224,157 B2 | 5/2007 | Watanabe et al. | |
| 7,248,034 B2 | 7/2007 | Watanabe et al. | |
| 2007/0083342 A1 | 4/2007 | Watanabe et al. | |
| 2007/0158699 A1 | 7/2007 | Watanabe et al. | |
| 2008/0074180 A1 | 3/2008 | Watanabe et al. | |
| 2009/0015074 A1 | 1/2009 | Watanabe et al. | |
| 2009/0218613 A1 | 9/2009 | Watanabe | |

FOREIGN PATENT DOCUMENTS

| | | |
|---|---|---|
| EP | 1 081 577 A2 | 3/2001 |
| EP | 1 381 159 A2 | 1/2004 |
| JP | 2004-172404 | 6/2004 |
| JP | 2004-326981 | 11/2004 |

OTHER PUBLICATIONS

Noboru Ishihara, et al., "Flash Memory Business Saizensen", Kogyochosakai Publishing Co., Ltd., Mar. 25, 2001, 4 Pages.

* cited by examiner

*Primary Examiner*—Pho M Luu
*Assistant Examiner*—Tha-O Bui
(74) *Attorney, Agent, or Firm*—Oblon, Spivak, McClelland, Maier & Neustadt, L.L.P.

(57) ABSTRACT

Time-switch carrying removable storage includes a memory cell array, a bit line decoder connected with bit lines of the memory cell array, a word line decoder connected with word lines of the memory cell array, a bit line system amplifier connected with the bit line decoder, a word line system amplifier connected with the word line decoder, a semiconductor time switch clamped or bridged between the bit line system amplifier and the bit line decoder, and performing time management of access of the bit line amplifier and the bit line decoder to/from each other without a power supply, a time switch initializer which sets an operation period of the semiconductor time switch, and a controller connected with the bit line system amplifier and the word line system amplifier to control the amplifiers, and having an I/O terminal which transmits/receives an input/output signal.

13 Claims, 5 Drawing Sheets

|  | Forget | | Remember | |
|---|---|---|---|---|
|  | p-MOSFET | n-MOSFET | p-MOSFET | n-MOSFET |
| Type | Normally off | | Normally on | |
| Switch | On → Off | | Off → On | |
| Carrier | Electron | Hole | Hole | Electron |

TIME-SWITCH CARRYING REMOVABLE STORAGE AND SEMICONDUCTOR INTEGRATED CIRCUIT

CROSS-REFERENCE TO RELATED APPLICATIONS

This application is based upon and claims the benefit of priority from prior Japanese Patent Application No. 2006-324729, filed Nov. 30, 2006, the entire contents of which are incorporated herein by reference.

BACKGROUND OF THE INVENTION

1. Field of the Invention

The present invention relates to removable storage which enables life time management without a power supply, and to a semiconductor integrated circuit.

2. Description of the Related Art

With advancement of an information-oriented society, spread of a semiconductor memory as removable storage is remarkable. Among others, a flash memory is aboundingly used with spread of a digital camera or a mobile phone (see, e.g., Flash Memory Business Saizensen, Kyogyochosakai Publishing Co., Ltd. [Tokyo]). In the world of music distribution, a structure where a flash memory is accommodated in a package with a universal serial bus connector is aboundingly used because of facilitation of connection with a personal computer (a PC) and convenience in portability.

Contents distribution using a cable television or the Internet has already spread, and a contents distribution service can be used any time as long as a subscribing download terminal is present. However, even a subscriber cannot view/listen to contents by using, e.g., a personal computer or a mobile phone in a study room or an in-vehicle terminal if he/she does not have the download terminal.

Further, although a CD or a DVD that can be viewed/listened for a fixed period alone has also come into practical use, a medium after viewing/listening becomes a waste, and hence an environment problem remains. That is, there is a problem of a person who disposes this medium, thereby obstructing spread of the media.

Therefore, realization of removable storage and a semiconductor integrated circuit with a low bit cost that enables a contents provider to set a contents service period has been demanded.

BRIEF SUMMARY OF THE INVENTION

According to one aspect of the invention, there is provided time-switch carrying removable storage which includes:

a memory cell array;

a bit line decoder connected with bit lines of the memory cell array;

a word line decoder connected with word lines of the memory cell array;

a bit line system amplifier connected with the bit line decoder;

a word line system amplifier connected with the word line decoder;

a semiconductor time switch clamped or bridged between the bit line system amplifier and the bit line decoder, and performing time management of access of the bit line amplifier and the bit line decoder to/from each other without a power supply;

a time switch initializer which sets an operation period of the semiconductor time switch; and a controller connected with the bit line system amplifier and the word line system amplifier to control the amplifiers, and having an I/O terminal which transmits/receives an input/output signal.

DETAILED DESCRIPTION OF THE INVENTION

Before describing embodiments of the present invention, a concept of the present invention will be explained. Image information or audio information may be desirably provided in a fixed period alone in some cases. For example, that is a case of providing a viewable data in a broadcasting period of a serial broadcasting program or distributing new contents before a release day and disclosing the contents on the release day all at once.

To achieve this object, combining a semiconductor memory that stores information with a semiconductor time switch that controls a time (a period) can be considered. The present inventor has already given many reports about the semiconductor time switch as an aging device (see, e.g., JP-A 2004-94922 [KOKAI], JP-A 2004-172404 [KOKAI], JP-A 204,326,981 [KOKAI], U.S. Pat. No. 7,075,284B2 and others). Thus, an outline of the aging device (a solid state aging device (SSAD)) will be first explained.

Figure 7A:
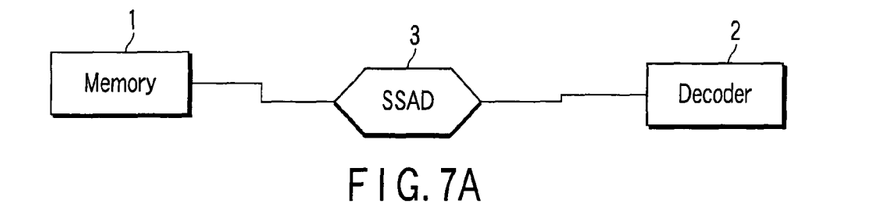
FIGS. 7A and 7B are circuit diagrams for explaining basic connection of an SSAD.
Figure 7B:
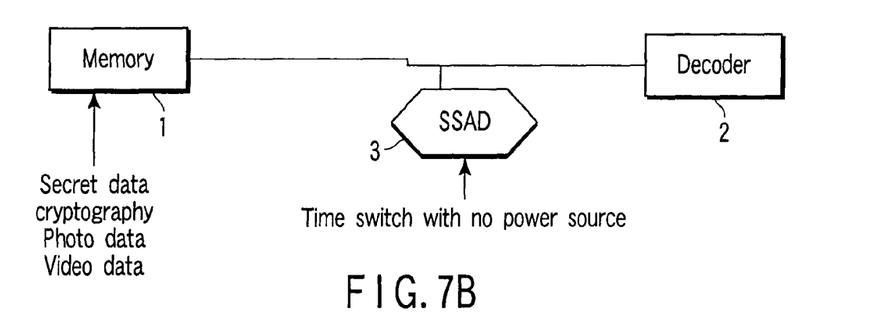

FIGS. 7A and 7B are views showing a basic circuit system using the SSAD. As shown in the drawings, the SSAD 3 is configured to be bridged (FIG. 7A) or clamped (FIG. 7B) between a memory 1 that records contents or secret information therein and a decoder 2 that reads the contents or the secret information. In both examples, a function is the same, and both the structures can be freely selected in accordance with convenience in a circuit design. As the function, the SSAD 3 executes time management without a power supply, and controls access of the memory 1 and the decoder 2 to/from each other. As a result, information stored in the memory 1 can be read only in a validity period set in the SSAD 3 in advance. If the stored data is entertainment contents, the entertainment contents can be viewed/listened in the validity period alone.

Figure 8:
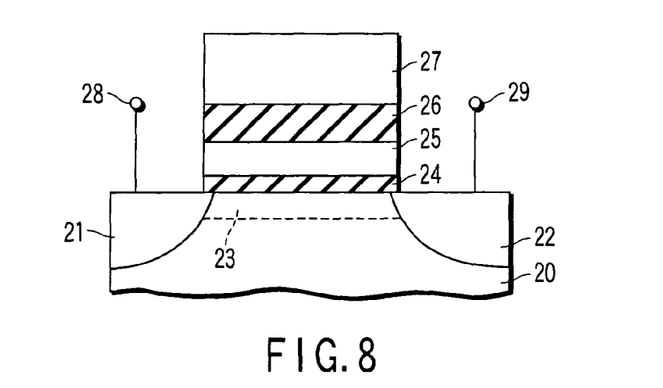
FIG. 8 is a cross-sectional view for explaining a basic structure of the SSAD.

FIG. 8 shows an example of a basic structure that realizes the SSAD. A source region 21 and a drain region 22 are provided on a surface part of a silicon substrate 20 to interpose a gap therebetween, a floating gate 25 is formed on a channel 23 between the source region 21 and the drain region 22 via a tunnel insulating film (a first gate insulating film) 24, and a control gate 27 is formed on the floating gate 25 via an insulating film (a second gate insulating film) 26. A source electrode 28 and a drain electrode 29 are provided on the source region 21 and the drain region 22, respectively.

Although this structure is basically the same as an EEPROM having a two-layer gate structure, a film thickness of the tunnel insulating film 24 is thinner than that in a general memory cell. Specifically, a film thickness of a tunnel insulating film in a general memory cell is approximately 10 nm, whereas a film thickness of the tunnel insulating film in the memory cell used for the present aging device is as thin as 1 to 6 nm. Here, for example, when electrons are injected into the floating gate 25 at the time of initialization, the electrons diffuse to disappear with time. The channel region 23 is turned on at the time of initialization, and a space between the source electrode 28 and the drain electrode 29 is finally turned off. That is, this device constitutes a time switch without a power supply in which the source electrode 28 and the drain electrode 29 serve as input and output terminals.

Figure 9:
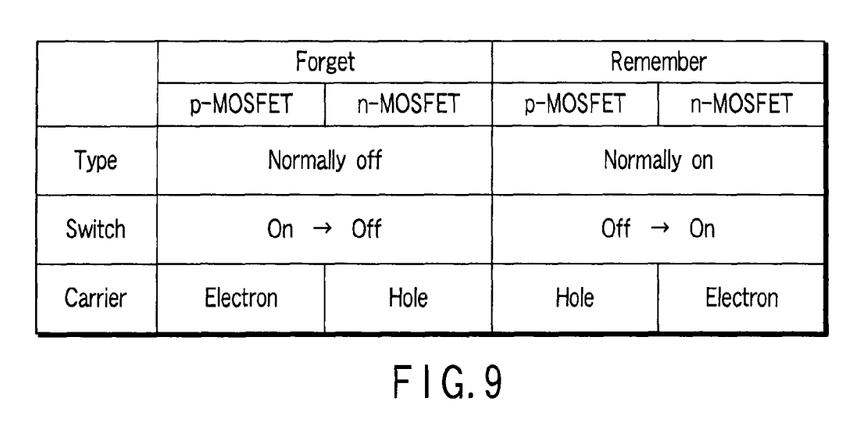
FIG. 9 is a diagram for explaining a basic usage of the SSAD.

As the aging device, there are two types, i.e., a normally-off type wherein a signal disappears when the end of life is reached and a normally-on type wherein a signal is generated when the end of life is reached. Here, FIG. 9 briefly shows classifications of the normally-off type and the normally-on type.

Figure 10A:
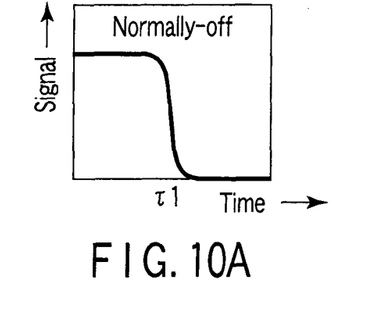
FIGS. 10A and 10B are views for explaining aged changes of two basic types, i.e., a normally-on/-off type and a normally-on type of the SSAD.

The normally-off type is in the off state before electric charges are injected into the gate. This type is previously turned on by injecting electric charges into the gate (initialization). The electric charges injected into the gate escape due to a leakage current, and an output signal is reduced with time. A graph of FIG. 10 shows such a state. Electrons are injected into the gate in case of a pMOSFET type, and holes are injected into the same in case of an nMOSFET. This realizes a function to "forget with a life time $\tau 1$".

Figure 10B:
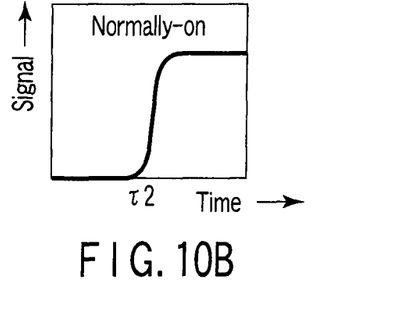

The normally-on type is in the on state due to impurity diffused in the channel in advance even before electric charges are injected into the gate. This type is previously turned off by injecting electric charges into the gate (initialization). The electric charges injected into the gate escape due to a leakage current, and an output signal is increased with time. A graph of FIG. 10B shows such a state. This graph shows a state where the channel is reversed at a time $\tau 2$ and the signal is precipitously increased. Holes are injected into the gate in case of the PMOSFET type, and electrons are injected into the same in case of the nMOSFET type. This realizes a function to "remember with a life time $\tau 2$".

Figure 11A:
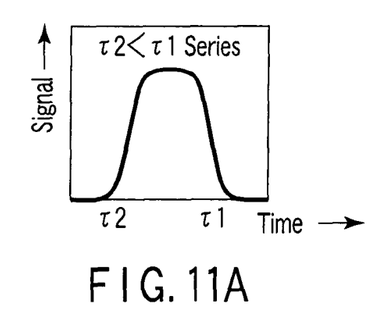
FIGS. 11A and 11B are views for explaining aged change of a convex shape and a concave shape based on a combination of the normally-on/-off type and the normally-on type.
Figure 11B:
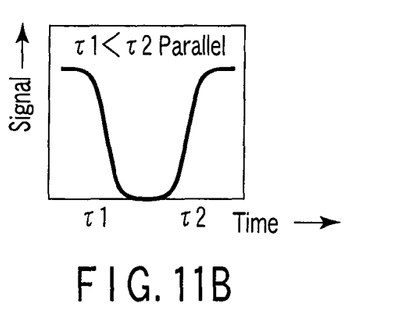

Here, connecting the normally-on type aging device having the life time $\tau 2$ with the normally-off type aging device having the life time $\tau 1$ in series, an aged change in a signal demonstrates a convex shape as shown in FIG. 11A when the condition $\tau 2 < \tau 1$ is satisfied. On the other hand, connecting the normally-on type aging device having the life time $\tau 2$ with the normally-off type aging device having the life time $\tau 1$ in parallel, an aged change in a signal demonstrates a concave shape as shown in FIG. 11B when the condition $\tau 2 > \tau 1$ is satisfied.

Furthermore, controlling unevenness in life time is difficult when the aging device is solely used. However, the present inventor has already proposed a method of controlling unevenness in life time by connecting a plurality of aging devices (see JP-A 2004-172404 [KOKAI]).

A bit cost of a file memory when a security system is added to a semiconductor memory will now be considered. Considering realization of the security system in an integrated circuit, a result obtained by dividing a sum of a cost of a memory region and a cost of a security region by a bit number of a memory is a bit cost. In this case, if the memory region and the security region can be formed as one chip, the bit cost can be greatly reduced.

Thus, an embedded memory having the SSAD added to a semiconductor memory will now be considered. When the SSAD is embedded in the same chip size, a total bit number may be reduced several %, but it can be considered that the bit cost is lowered in whole. Although a NAND-type flash memory is currently spread as a file memory in a marketplace, this means that the bit cost with the security cost added thereto can be suppressed even if miniaturization of the NAND-type flash memory reaches its limit.

Meanwhile, a so-called USB flash drive (flash memory) having a structure that the NAND flash memory is accommodated in a package including a universal serial bus connector has been widely used as removable storage. When the SSAD is added to this NAND flash removable storage, it can be supplied to the marketplace as removable storage with a time limit. After the time limit is reached, new contents can be charged in this removable storage, or this removable storage can be reutilized as a regular removable storage.

Figure 1:
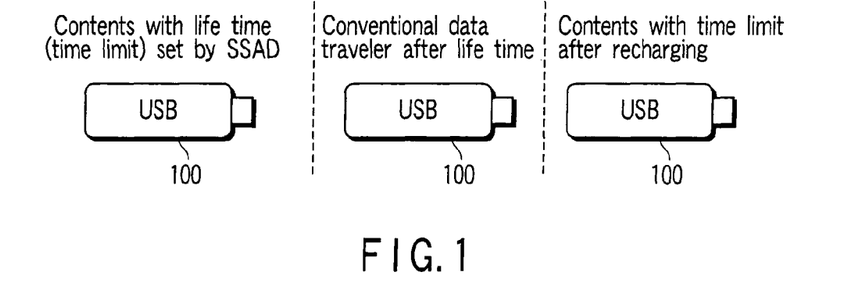
FIG. 1 is a schematic view for explaining a basic concept of the present invention.

FIG. 1 is a view for explaining a basic concept of the present invention. In, e.g., a USB flash drive (flash memory) including a NAND flash with an SSAD satisfying the structure according to the present invention, contents are stored in a memory cell array formed of the NAND flash, and the SSAD manages a validity limit of the contents. Since the SSAD can perform batteryless time management, a battery does not have to be mounted on the USB flash drive (flash memory). Further, this USB flash drive can be also utilized as a regular USB flash drive out of the validity period managed by the SSAD is reached. Furthermore, when a contents distributor (a primary user) can use a cryptographic key to refresh the SSAD, the validity period of the SSAD can be reset as required, and hence this memory can be reutilized as removable storage for contents distribution. As explained above, the fact that the medium does not become a waste is one of great advantages of the present invention.

According to the following embodiments of the present invention, it is possible to provide the removable storage with a low bit cost which enables a contents provider to set a time limit of contents and which can be also used as a general-purpose memory after end of the use limit, and the semiconductor integrated circuit.

Specific embodiments according to the present invention will now be explained hereinafter.

First Embodiment

Figure 2:
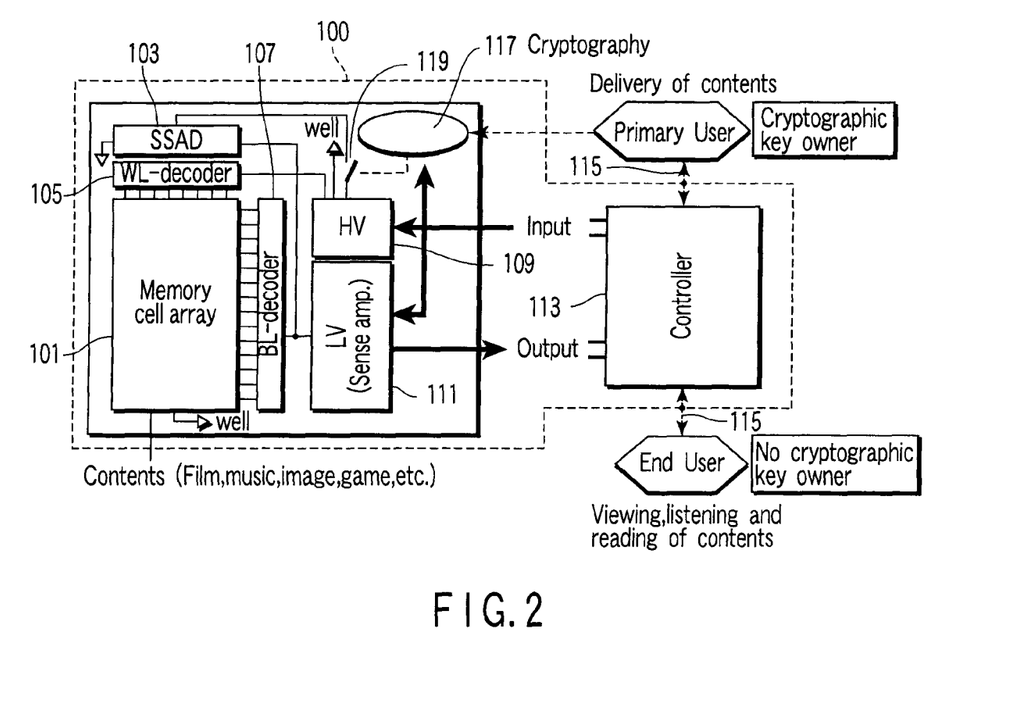
FIG. 2 is a block diagram of removable storage according to a first embodiment.

FIG. 2 is a block diagram showing a basic system of removable storage according to a first embodiment. This system includes a controller 113 that is accessed by a contents provider (a primary user) and a viewer (an end user) through an I/O terminal 115, a high-voltage (HV) system amplifying circuit (a word line system amplifying circuit) 109 that accepts an input from this controller 113, a low-voltage (LV) system amplifying circuit (a bit line system amplifying circuit, an sense amplifier) 111 that accepts an input from the controller 113, a bit line (BL) decoder 107 controlled by the LV system amplifying circuit 111, a word line (WL) decoder 105 controlled by the HV system amplifying circuit 109, a memory cell array 101 in which bit lines are controlled by the BL decoder 107 and word lines are controlled by the WL decoder, an SSAD 103 that is clamped between the LV system amplifying circuit 111 and the BL decoder 107 to perform time management of access of the LV system controller and the BL decoder to/from each other without a power supply, and an initialization switch 119 which is interposed between the SSAD 103 and the HV system amplifier 109 to initialize the SSAD 103.

A cryptographic device 117 controls the initialization switch 119, the primary user who has a cryptographic key gives the key to the cryptographic device 117 through the controller 113 (the primary user and the cryptographic device 119 are directly connected with each other through a dotted line in the drawing for simplicity) to turn on the initialization switch 119, and the HV system amplifier 109 initializes (charges) the SSAD 103. At the end of this charging, contents are recorded in the memory cell array 101. The contents include a film, an image, a game, and others.

The removable storage can be realized as an integrated circuit chip. In this case, the initialization switch 119 is inserted into a space between a well in a semiconductor substrate, e.g., a silicon substrate having the SSAD formed thereon and a well in the silicon substrate having each block in the memory cell array 101 formed thereon, and it serves as an initialization switch that is controlled to be opened/closed based on cryptographic.

Moreover, the integrated circuit chip can be accommodated in a package with a USB connector, and used as a so-called USB flash drive (flash memory).

The end user does not own the cryptographic key, and can just read contents. It is presumed that the contents distributor manages the cryptographic key and the end user who sets up contracts with the contents distributor and views/listens to contents does not know about this cryptographic key.

In other words, it can be said that users can be discriminated based on ownership of the cryptographic key. A user who manages the cryptographic key is the primary user, and a user who does not manage the cryptographic key is the end user. Additionally, it can be said that a user who does not present the cryptographic key is the end user.

That is, according to the removable storage of this embodiment, a person who owns the cryptographic key and accesses the controller 113 is regarded as an information provider, a person who is allowed to write/erase data with respect to the memory cell array 101 and accesses the controller 113 without the cryptographic key is regarded as an information user, and reading information in the memory cell is allowed only in a desired period managed by the SSAD 103.

Here, the cryptographic device 117 may be software or hardware. In case of software, it is stored in a memory region (it may be a part of the memory cell array 101, but it may be also another memory region in the controller 113). When the primary user presents the cryptographic key to the controller 113, the controller 113 loads cryptographic software from the memory region and performs decryption by using the cryptographic key presented by the primary user. The SSAD 103 is initialized in this manner.

The SSAD 103 just manages a time of viewing/listening or reading without using a battery, but it basically has four functions as explained in conjunction with FIGS. 10A, 10B, 11A, and 11B. At first, access is enabled before a given life time, but access is disabled when the life time is exceeded (FIG. 10A). At second, access is disabled before a given life time, but it is enabled when the life time is exceeded (FIG. 10B). At third, access is disabled before a first life time, it is enabled in a period from the first life time to a second life time, and it is again disabled after the second life time (FIG. 11A). At fourth, access is enabled before the first life time, but it is disabled in a period from the first life time to the second life time, and it is again enabled after the second life time (FIG. 11B).

The system using the SSAD 103 can manage a contents reading period based on combinations of these four functions. Furthermore, since time management is carried out without a power supply, a battery does not have to be incorporated in the removable storage 100, and the system does not have to be connected with, e.g., a terminal that can receive power in order to manage the period. However, it is needless to say that power is supplied through the I/O terminal 115 when operating the removable storage 100 itself.

According to this embodiment, this SSAD 103 manages access of the BL decoder 107 and the LV system amplifying circuit 111 to/from each other. When using the normally-on type SSAD having the function depicted in FIG. 10B, the SSAD has a low impedance when its life time is ended, thereby disabling the function of the BL decoder 107. Likewise, using the SSAD having the functions depicted in FIGS. 10A, 11A, and 11B means that the end user cannot read contents stored in the memory cell array 101 through the controller out of the contents reading period set in the SSAD 103.

On the other hand, the primary user can use the cryptographic key that the end user does not know to control the HV system amplifying circuit through the controller 113 and reset the life time of the SSAD 103. That is, even if the validity period is once expired, the life time can be reset to prolong the reading period, or other contents can be recorded in the memory cell array 101 to set the life time.

Further, as shown in FIGS. 10A, 10B, 11A, and 11B, if access cannot be made to information because the life time is ended, i.e., if enabling reading is impossible out of the life time, the LV system amplifying circuit 111 cannot receive a signal from the BL decoder 107 when the end user tries accessing the memory cell array through the controller. At this time, the LV system amplifying circuit 111 can inform the controller 113 of the fact that receiving the signal from the BL decoder 107 has failed, and the controller 113 can command the HV system amplifying circuit to collectively erase (flash) information recorded in the memory cell array 101.

That is, when the controller 113 determines that access of the BL decoder 107 and the LV system amplifier 111 to/from each other is interrupted, the controller 113 can issue a command of concurrently writing information into a block having information recorded therein in the memory cell array 101 or all memory cells in the memory cell array 101 and erasing all of the recorded information through the WL decoder 105. In this case, expired information physically disappears from this world.

Generally, the flash of memory can be realized by applying a high voltage to wells through the HV system to set all memory cells to "0". Specifically, applying a high voltage from the HV system amplifying circuit to the wells depicted in FIGS. 2 to 6 enables writing "0" in a memory cell in a corresponding block or all memory cells. On the other hand, the method of writing "1" into all memory cells through the word line decoder to erase information has been explained herein. This embodiment can select both the methods.

Furthermore, in later-explained systems depicted in FIGS. 3 and 6, likewise, a disruption of a signal from the BL decoder 107 enables flashing. On the other hand, in later-explained systems depicted in FIGS. 4, 5, and 6, a disruption of a signal from the word line decoder 105 enables flashing. In FIG. 6, flashing can be performed when a signal from the word line decoder 105 or the bit line decoder 107 is disrupted.

Since the above-explained functions can be also realized by applying a technology disclosed in JP-A 2004-326981 [KOKAI], the contents of this publication will be briefly explained. FIG. 11 of this publication is selected and adopted in FIGS. 12A and 12B (however, reference numerals are changed). This semiconductor storage device 40 includes non-volatile memory cells 41, reset transistors 42 each of which is connected between a word line connected with a gate of the memory cell 41 and a booster 43, and an aging device 44 in which an input terminal is connected with the booster 43, an output terminal is connected with a gate of the transistor 42, an output signal becomes lower than a threshold value of the transistor 42 when data is read before end of a life time, and the output signal becomes higher than the threshold value of the transistor 42 after end of the life time. When power is supplied after end of the life time of the aging device 44, the transistor 42 is turned on, and information stored in the memory cell 41 is reset.

Figures 12A, 12B:
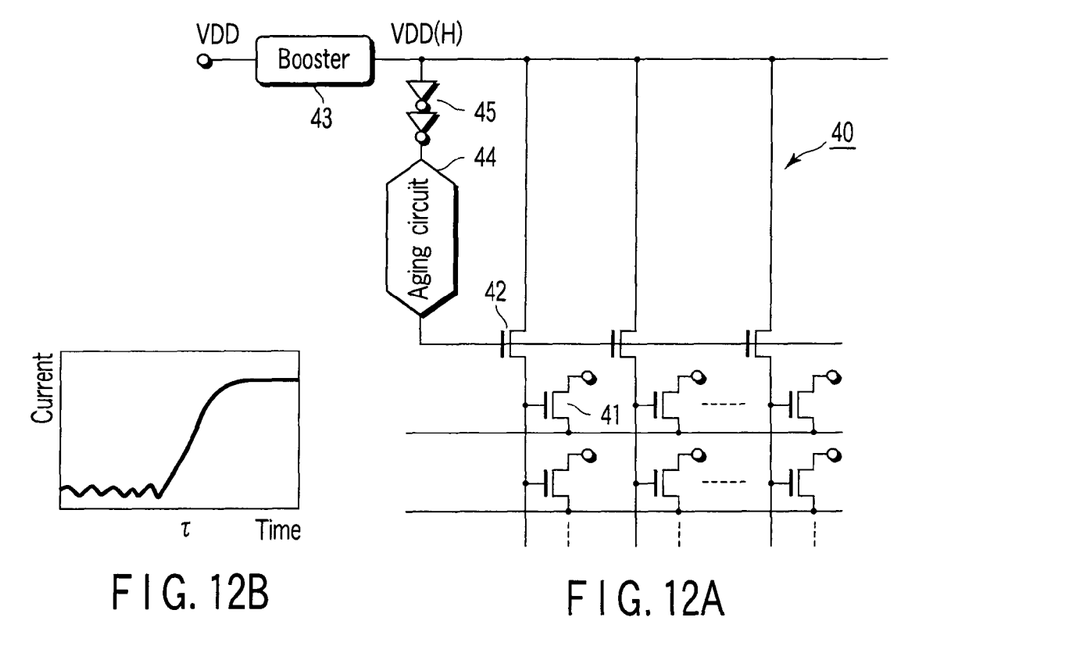
FIGS. 12A and 12B are a circuit diagram for explaining a method of using an aging circuit to concurrently erase data in a plurality of memories after a fixed time, and a characteristic view showing current/time characteristics of the aging circuit used in this method.

When applying the above-explained method to this embodiment, it is preferable for the aging circuit 44 to be provided separately from the SSAD 103, but the HV system amplifying circuit 109 can be used as the booster 43. Replacing the memory cell 41 with a NAND cell is easy.

Furthermore, in the above example, when the end user tries accessing the memory cell array through the controller after end of the life time, the LV system amplifying circuit 111 cannot receive a signal from the BL decoder 107, but it can outputs a signal indicative of access denial from the SSAD 103. At this time, the LV system amplifying circuit 111 transfers this access denial signal to the controller 113, and the controller 113 can command the HV system amplifying circuit 109 to flash the memory cell array 101.

As explained above, according to the first embodiment, when the SSAD 103 is interposed between the BL decoder 107 and the LV system amplifying circuit 111, a time limit of the removable storage can be set, thereby realizing the removable storage with a limit at a low bit cost.

Second Embodiment

Figure 3:
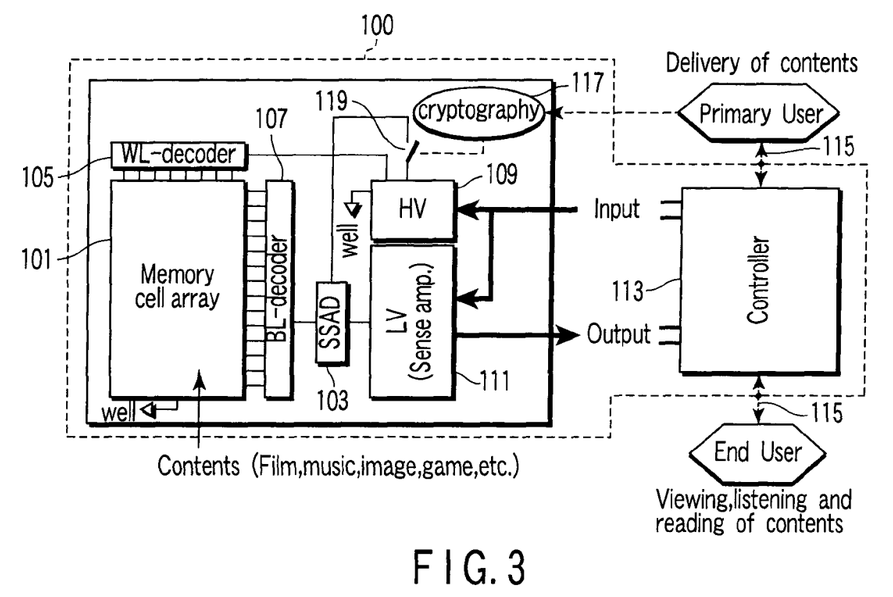
FIG. 3 is a block diagram of removable storage according to a second embodiment.

FIG. 3 is a block diagram of removable storage according to a second embodiment, and like reference numerals denote the same elements as those in the first embodiment, thus omitting a tautological explanation. In FIG. 3, an SSAD 103 having one of the functions depicted in FIGS. 10A, 10B, 11A, and 11B is bridged between a BL decoder 107 and an LV system amplifying circuit. In this case, when the SSAD is in an non-access state (an off state), access of the BL decoder 107 and the LV system amplifying circuit to/from each other is turned off to disable a function of the BL decoder 107. As a result, the same effect as that of the first embodiment can be demonstrated.

The data carrier can be realized as an integrated circuit chip. In this case, the initialization switch 119 is inserted in a space between a well in a semiconductor substrate, e.g., a silicon substrate having the SSAD 103 formed thereon and a well in the silicon substrate having each block of the memory cell array 101 formed thereon, and functions as an initialization switch that is controlled to be opened/closed based on cryptography.

Moreover, the integrated circuit chip can be accommodated in a package having a USB connector, and used as a so-called USB flash drive.

Third Embodiment

Figure 4:
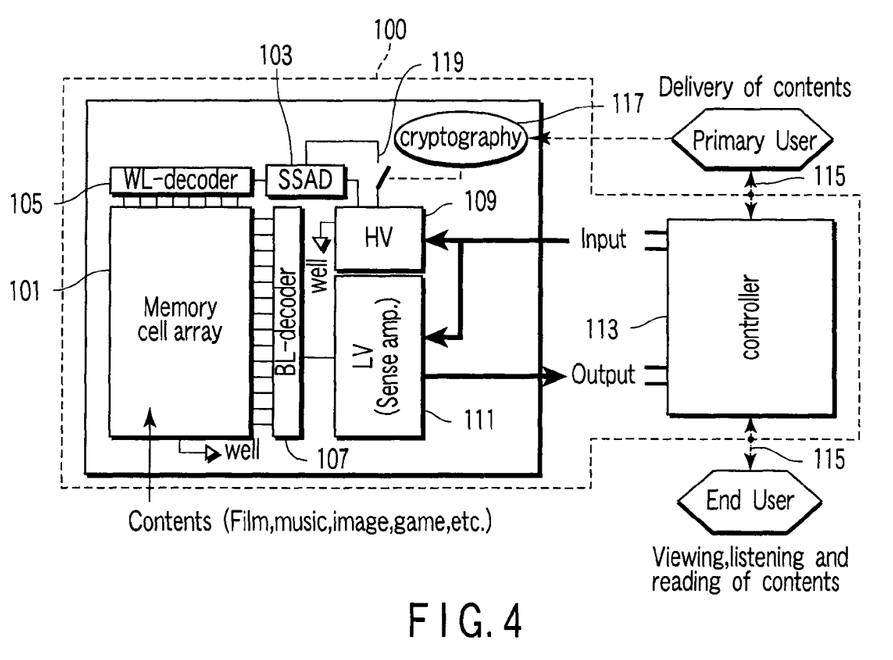
FIG. 4 is a block diagram of removable storage according to a third embodiment.

FIG. 4 is a block diagram of removable storage according to a third embodiment, and like reference numerals denote the same elements as those in the first embodiment, thereby omitting a tautological explanation. In FIG. 4, an SSAD 103 having one of the functions depicted in FIGS. 10A, 10B, 11A, and 11B is bridged between a WL decoder 105 and an HV system amplifying circuit 109. When reading information stored in a memory cell array 101, the WL decoder 105 must switches on/off states of each memory transistor. When access of the HV system amplifying circuit 109 and the WL decoder 105 to/from each other is disrupted and a controller 113 cannot consequently control the WL decoder 105, information recorded in the memory cell array cannot be substantially read. As explained above, according to the third embodiment, the same function and the same effect as those of the first and second embodiments can be realized.

In the third embodiment, as well, when the controller 113 determines that access of the bit line decoder 107 and the bit line system amplifier 111 to/from each other is interrupted, the controller 113 can issue to the word line system amplifier 109 a command of concurrently writing information in a block having information recorded therein in the memory cell array 101 or all memory cells in the memory cell array 101 through the word line decoder 105 and erasing all recorded information.

The removable storage can be realized as an integrated circuit chip. In this case, the initialization switch 119 is inserted into a space between a well in a semiconductor substrate, e.g., a silicon substrate having the SSAD 103 formed thereon and a well in the silicon substrate having each block of the memory cell array 101 formed thereon, and functions as an initialization switch that is controlled to be opened/closed based on cryptography.

Additionally, the integrated circuit chip can be accommodated in a package having a USB connector, and used as a so-called USB flash drive (flash memory).

Fourth Embodiment

Figure 5:
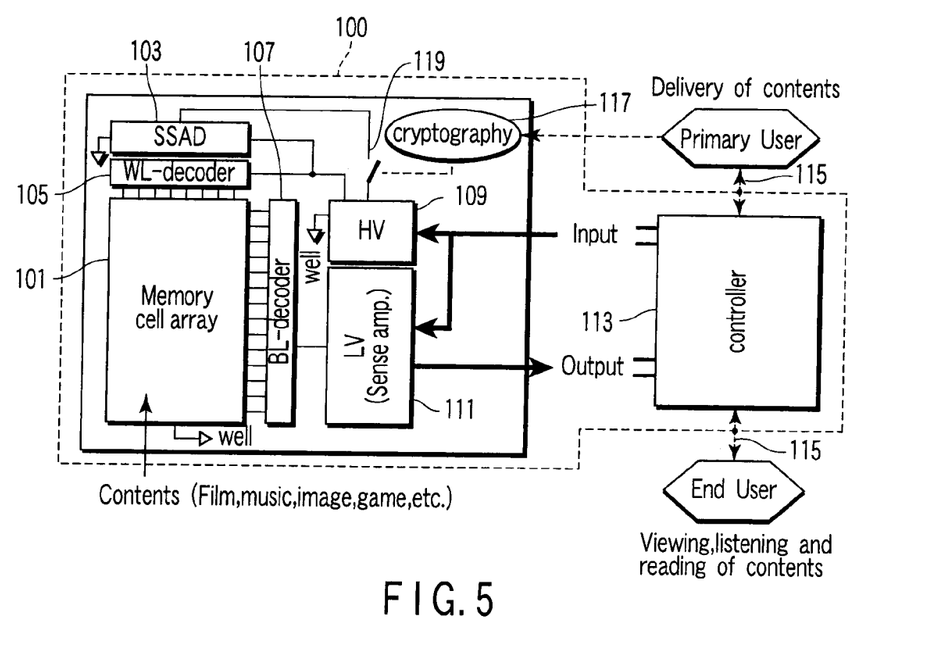
FIG. 5 is a block diagram of removable storage according to a fourth embodiment.
Figure 6:
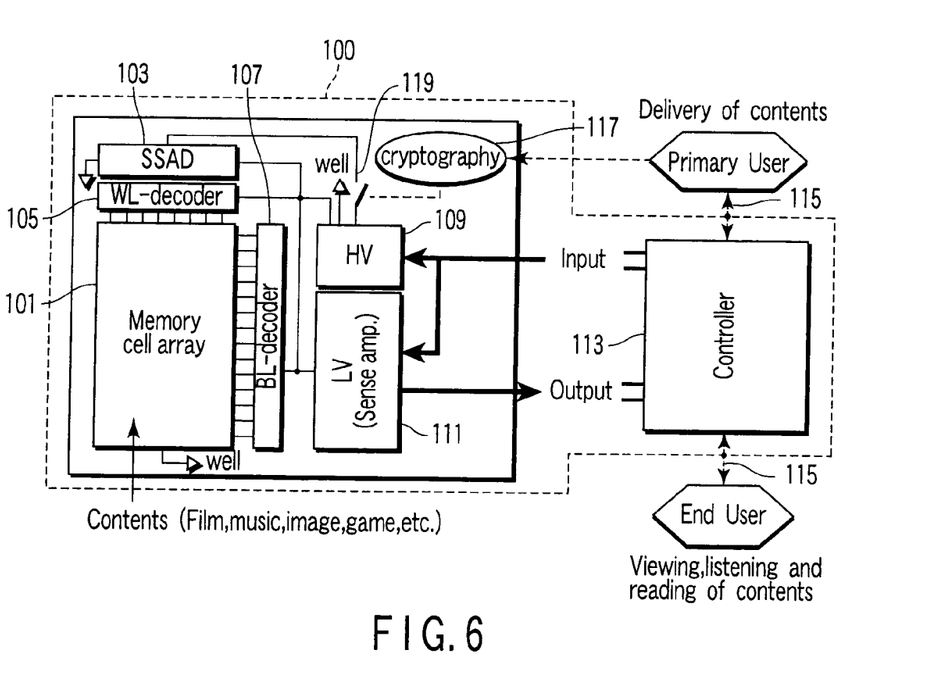
FIG. 6 is a block diagram of removable storage according to a fifth embodiment.

FIG. 5 is a block diagram of removable storage according to a fourth embodiment, and like reference numerals denote the same elements as those in the first embodiment, thereby omitting a tautological explanation. In FIG. 5, an SSAD 103 having one of the functions depicted in FIGS. 10A, 10B, 11A, and 11B is clamped between a WL decoder 105 and an HV system amplifying circuit 109. One end of an input/output terminal of the SSAD 103 serves as, e.g., a ground level. Therefore, the other end of the SSAD 103 connected with the WL decoder 105 also has a low impedance to disable a function of the WL decoder in the on-state of the SSAD 103.

In the fourth embodiment, as well, when the controller 113 determines that access of the bit line decoder 107 and the bit line system amplifier 111 to/from each other is interrupted, the controller 113 can issue to the word line system amplifier 109 a command of concurrently writing information in a block having information recorded therein in the memory cell array 101 or all memory cells in the memory cell array 101 through the word line decoder 105 and erasing all recorded information.

As explained above, according to the fourth embodiment, the same function and the same effect as those of the first to third embodiments can be realized.

The removable storage can be realized as an integrated circuit chip. In this case, the initialization switch 119 is inserted into a space between a well in a semiconductor substrate, e.g., a silicon substrate having the SSAD 103 formed thereon and a well in the silicon substrate having each block of the memory cell array 101 formed thereon, and functions as an initialization switch that is controlled to be opened/closed based on cryptography.

Further, the integrated circuit chip can be accommodated in a package having a USB connector, and used as a so-called USB flash drive (flash memory).

Fifth Embodiment

FIG. 6 is a block diagram of removable storage according to a fifth embodiment, and like reference numerals denote the same elements as those in the first embodiment, thereby omitting a tautological explanation. In FIG. 6, an SSAD 103 having one of the functions depicted in FIGS. 10A, 10B, 11A, and 11B is clamped between a WL decoder 105 and an HV system amplifying circuit 109 and between a BL decoder 107 and an LV system amplifying circuit 111. When the SSAD 103 enters an access state, one end of an input/output terminal of the SSAD 103 serves as a ground level. Therefore, the other end of the SSAD 103 connected with the WL decoder 105 and the BL decoder 107 also has a low impedance to disable functions of the WL decoder 105 and the BL decoder 107.

As explained above, according to the fifth embodiment, the same function and the same effect as those of the foregoing embodiments can be realized.

The removable storage can be realized as an integrated circuit chip. In this case, the initialization switch 119 is inserted into a space between a well in a semiconductor substrate, e.g., a silicon substrate having the SSAD 103 formed thereon and a well in the silicon substrate having each block of the memory cell array 101 formed thereon, and functions as an initialization switch controlled to be opened/closed based on cryptography.

Additionally, the integrated circuit chip can be accommodated in a package having a USB connector, and used as a so-called USB flash drive (flash memory).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. Time-switch carrying removable storage comprising:
a memory cell array;
a bit line decoder connected with bit lines of the memory cell array;
a word line decoder connected with word lines of the memory cell array;
a bit line system amplifier connected with the bit line decoder;
a word line system amplifier connected with the word line decoder;
a semiconductor time switch clamped or bridged between the bit line system amplifier and the bit line decoder, and performing time management of access of the bit line system amplifier and the bit line decoder to/from each other without a power supply;
a time switch initializer which sets an operation period of the semiconductor time switch; and
a controller connected with the bit line system amplifier and the word line system amplifier to control the bit line system amplifier and the word line system amplifier, and having an I/O terminal which transmits/receives an input/output signal.

2. The time-switch carrying removable storage according to claim 1, wherein the time switch initializer is an initialization switch inserted in a space between the semiconductor time switch and the word line amplifier and controlled to be opened/closed based on cryptography.

3. The time-switch carrying removable storage according to claim 1, wherein the I/O terminal includes a first input/output terminal which receives the information from an information provider to be recorded in the memory cell array, and a second input/output terminal used by an information user to access the information.

4. The time-switch carrying removable storage according to claim 3, wherein, when the information provider operates a cryptographic key through the controller, the time switch initializer connects the word line system amplifier with the semiconductor time switch for a predetermined time and injects initialization charges into the semiconductor time switch from the word line system amplifier to set the semiconductor time switch to an initial state of time development.

5. The time-switch carrying removable storage according to claim 3, wherein the information user utilizes the information stored in the memory cell array through the controller for a validity period managed by the semiconductor time switch.

6. The time-switch carrying removable storage according to claim 3, wherein, when the information user accesses the memory cell array through the controller, the controller judges from a response to the controller from the bit line system amplifier whether the time switch interrupts access of the bit line decoder and the bit line system amplifier to/from each other or access of the word line decoder and the word line system amplifier to/from each other.

7. The time-switch carrying removable storage according to claim 3, wherein a person who has a cryptographic key and accesses the controller is regarded as the information provider and allowed to perform writing/erasing with respect to the memory cell array, and a person who accesses the controller without the cryptographic key is regarded as the information user and allowed to read the information in the memory cell for a desired period managed by the time switch.

8. The time-switch carrying removable storage according to claim 1, wherein, when the controller determines that access of the bit line decoder and the bit line system amplifier to/from each other is interrupted, the controller issues to the word line system amplifier a command of concurrently writing information in a block having information recorded therein in the memory cell array or all memory cells in the memory cell array through the word line decoder and erasing all recorded information.

9. The time-switch carrying removable storage according to claim 1, further comprising a semiconductor substrate in which the removable storage is formed, wherein the time switch initializer is an initialization switch inserted in a space between a well in the semiconductor substrate having the semiconductor time switch formed thereon and a well in the semiconductor substrate having each block in the memory cell array formed thereon, and controlled to be opened/closed based on cryptography.

10. A semiconductor memory, comprising:

the time-switch carrying removable storage according to claim 1, and a package with a universal serial bus connector in which the time-switch carrying removable storage is accommodated.

11. A semiconductor integrated circuit comprising:

a semiconductor substrate; and a function circuit formed on the semiconductor substrate, the function circuit including:

a memory cell array;

a bit line decoder connected with bit lines of the memory cell array;

a word line decoder connected with word lines of the memory cell array;

a bit line system amplifier connected with the bit line decoder;

a word line system amplifier connected with the word line decoder;

a semiconductor time switch clamped or bridged between the bit line system amplifier and the bit line decoder and performing time management of access of the bit line system amplifier and the bit line decoder to/from each other without a power supply; and a time switch initializer which sets an operation period of the semiconductor time switch.

12. The semiconductor integrated circuit according to claim 11, wherein the time switch initializer is an initialization switch inserted in a space between the semiconductor time switch and the word line system amplifier and controlled to be opened/closed based on cryptography.

13. The semiconductor integrated circuit according to claim 11, wherein the time switch initializer is an initialization switch inserted in a space between a well in the semiconductor substrate having the semiconductor time switch formed thereon and a well in the semiconductor substrate having each block in the memory cell array formed thereon, and controlled to be opened/closed based on cryptography.

* * * * *